April 23, 1957 — N. G. MOEN — 2,789,389
LEADER HOLDER
Filed July 23, 1956
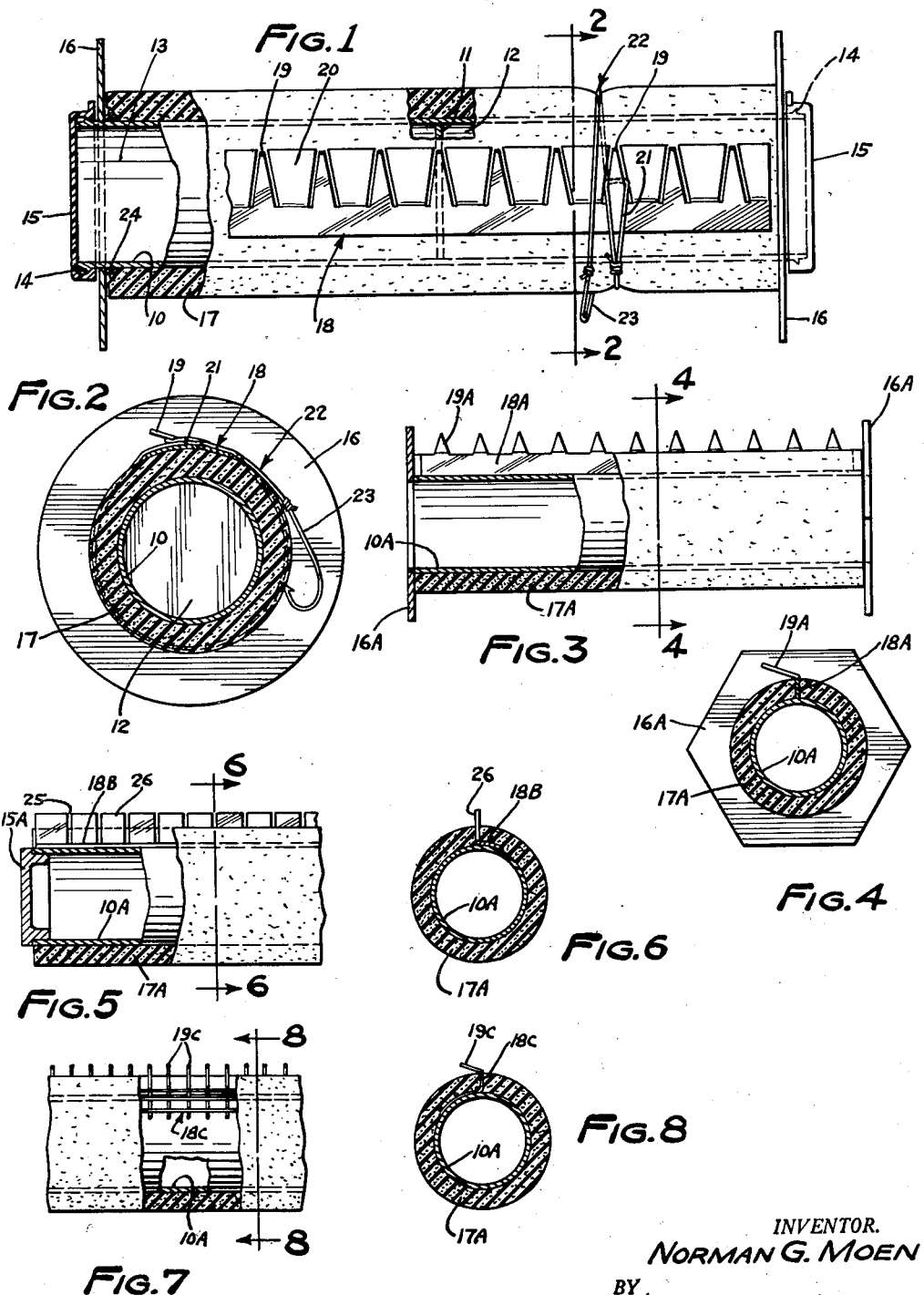
INVENTOR.
NORMAN G. MOEN
BY
Moore, Dugger, White & Burd
ATTORNEYS 2,789,389
Patented Apr. 23, 1957

2,789,389

LEADER HOLDER

Norman Granville Moen, Richfield, Minn.

Application July 23, 1956, Serial No. 599,498

11 Claims. (Cl. 43—57.5)

This invention relates to a new and useful holder for fishing leaders, snelled hooks, flies and the like. In its preferred form this invention relates to a holder for fishing leaders and the like having storage compartments for containing extra hooks, singers, etc.

The invention is illustrated by the drawings wherein the same numerals refer to corresponding parts and in which:

Figure 1 is an elevation, partly in section, of one form of leader holder according to this invention;

Figure 2 is a vertical section taken on the line 2—2 of Figure 1 and in the direction of the arrows;

Figure 3 is an elevation, partly in section, of an alternative form of leader holder according to this invention;

Figure 4 is a sectional vew taken on the line 4—4 of Figure 3 and in the direction of the arrows;

Figure 5 is an elevation, partly in section, of still another alternative form of leader holder;

Figure 6 is a vertical section taken along the line 6—6 of Figure 5 and in the direction of the arrows;

Figure 7 is an elevation, partly in section, showing a further alternative form of leader holder; and Figure 8 is a sectional view taken along the line 8—8 of Figure 7 and in the direction of the arrows.

Broadly stated, the leader holder of this invention comprises a generally cylindrical rigid base or core having a surrounding peripheral covering or sleeve of substantial uniform thickness of a resilient material and a longitudinal row of spaced projecting fastening elements extending above the peripheral surface of the resilient material. In its preferred forms, the cylindrical base for the leader holder may be tubular, preferably compartmented, and provided with end closures. The leader holder is also desirably provided with spool or reel ends so that the body of the leader holder may be supported without direct contact with the supporting surface.

Referring to the drawings, there is shown in Figures 1 and 2 one form of the leader holder of this invention. The holder comprises a rigid central cylindrical tubular base 10, divided by a partition 11 into two storage compartments 12 and 13. In this form of the invention the ends of tubular base 10 are provided with projecting peripheral ridges 14 to retain a flat snap-on resilient plastic end cap 15. A pair of annular rings 16 are affixed to each end of tubular body 10 adjacent to the end caps and normal to the axis of the tubular body. Surrounding the tubular body 10 between the end rings 16 there is a cylindrical tube or sleeve of substantial uniform thickness of soft pliable resilient material 17. Rings 16 are of a diameter such that they extend beyond the peripheral surfaces of the resilient pad 17. This is to afford protection for the leaders, flies, etc. on the holder.

Adhesively affixed to the outer periphery of the resilient pad 17 there is provided a leader retaining strip 18 running longitudinally substantially the length of the resilient pad. Strip 18 is formed from metal or resinous plastic sheet material slotted obliquely alternately one direction and then the other along one longitudinal edge to provide a plurality of pointed hook-like members 19 alternating with wedge-shaped spacer members 20. As shown in Figure 2, the hook-like members 19 are bent upwardly in the same direction to project obliquely with respect to the remainder of strip 18 which is curved slightly to correspond to the peripheral cylindrical surface of pad 17 and adhesively secured thereto.

In use, the loop 21 of a fishing leader 22 is caught over the projecting point of hook 19 and the leader is wrapped around the cylindrical body of the leader holder and securely held in place by inserting the barb of the fishhook 23 into the resilient pad 17. The leader is readily removed by releasing hook 23 from the resilient pad and unwinding the leader, freeing the loop from hook 19.

Tubular body 10 may be made of any strong substantially rigid material, preferably metal or resinous plastic material. Instead of a tubular body a solid cylindrical body such as wood or cork or the like may be used. The resilient pad may be formed from foam rubber or rubber-like synthetic resinous materials, sponge rubber or rubber-like materials, felt, cork or the like. In the embodiment shown in Figures 1 and 2 the pad 17 may be formed as a tubular sleeve as shown, or alternatively it may be formed from a flat sheet wrapped about the cylindrical body and secured along the mating edges.

It is desirable that the resilient pad be adhesively secured to the cylindrical body. However, when the pad is so secured it is preferably left unsecured for a short distance adjacent at least one of the ends of the holder. This, along with the natural resiliency of the pad permits the storage of a supply of extra leader line 24 around the outer periphery of the cylindrical body and under the end portion of the resilient pad.

In Figures 3 and 4 there is shown an alternative form of construction. The cylindrical body in this embodiment is a plain rigid tube 10A. End rings 16A are provided with a hexagonal or other polygonal shape to prevent or minimize rolling of the leader holder when it is placed on a flat surface. Resilient pad 17A is formed from a flat sheet wrapped around the tubular body and adhesively secured to the leader attaching strip and/or the tubular base. The modified leader attaching strip 18A is a flat elongated relatively rigid strip having a plurality of spaced apart pointed hook-like member 19A along one edge. The hook-like elements are bent obliquely with respect to the remainder of the strip which is adhesively scecured along its edge longitudinally along one edge of the tubular body and substantially normal to the cylindrical surface. Alternatively, strip 18A may be secured to the tubular body at an oblique angle in which event the hook-like members 19a may be bent less or not at all.

Another embodiment of the invention is shown in Figures 5 and 6. The body and pad construction is as previously described with reference to Figures 3 and 4. The open ends of tubular body 10A are provided with simple friction caps 15A. The tube may be divided into two storage compartments or not, as desired. The end rings have been omitted. The leader securing strip 18B is formed of a flat relatively rigid elongated rectangular strip having a plurality of spaced slots 25 cut into one longitudinal edge between spacers 26. The slotted strip is folded longitudinally at about a right angle and secured to the cylindrical body 10A with the slotted edge projecting outwardly from the tube body. The resilient pad 17A is wrapped around the body and secured to the body and the strip 18B.

To store leaders or the like on this form of holder the loop of the leader may be inserted through two adjacent slots 25 and around the intervening spacer 26 and then the leader is wrapped around the holder and secured by means of the fish-hook as previously described. Alternatively the leader is inserted in one of slots 25 and pulled up until the knot of the loop engages the sides of the slot. The leader is then wrapped around and the hook is caught in the resilient pad in the normal manner.

In Figures 7 and 8 there is shown still a further modified form of leader holder utilizing a leader securing strip 18C formed from an elongated rectangular strip of galvanized coarse wire mesh. The wire mesh strip is cut to remove one of the longitudinal wire filaments from one edge to leave a plurality of spaced projecting wire pins 19C along that edge. The projecting pins 19C are bent over in one direction, obliquely with respect to the rest of the strip. The strip is again bent in the same direction and the edge opposite to the projecting pins is secured to the tubular body, leaving a width between the body surface and the projecting pins corresponding generally to the thickness of the resilient pad. The pad is enfolded around the cylindrical body and secured with the seam at the leader securing strip as heretofore explained. This embodiment of the leader holder is utilized as described with reference to Figures 1 to 4.

It will be readily apparent that any of the several forms of leader attaching means may be used with any of the several forms of cylindrical base, whether tubular or solid, closed to form storage compartments or not. Where storage compartments are provided there may be one large or two smaller chambers. The compartments may obviously be closed by snap-on end closures or friction plugs, as shown, or by screw caps or the like provided only that appropriate securing means also be provided on the ends of the tubular body. Likewise, the annular end rings may be used or not, as desired, and these rings may be either circular or polygonal.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A leader holder for use by anglers which comprises a generally cylindrical substantially rigid body, a cylindrical resilient pad of substantial uniform thickness surrounding said body and a longitudinal row of a plurality of spaced leader holding elements projecting outwardly from the peripheral surface of said resilient pad.

2. A leader holder according to claim 1 further characterized in that said cylindrical body is tubular.

3. A leader holder according to claim 2 further characterized in that said tubular body is provided with end closures to form at least one internal storage compartment.

4. A leader holder according to claim 3 further characterized in that said tubular body is provided with a transverse wall perpendicular to the body walls and dividing the body into two storage compartments.

5. A leader holder according to claim 1 further characterized in that the ends of said cylindrical body are provided with annular rings, the outside diameters of said rings being greater than the maximum diameter of said cylindrical resilient pad and projecting leader holding elements.

6. A leader holder according to claim 5 further characterized in that the inner surface of said resilient pad adjacent to at least one of said end rings is unsecured to said cylindrical body whereby extra leader line may be stored on the outer periphery of said cylindrical body adjacent to said end ring and under said pad.

7. A leader holder according to claim 5 further characterized in that said end rings are polygonal.

8. A leader holder according to claim 1 further characterized in that said resilient pad is formed of a material selected from the group consisting of foam and sponge rubbers and rubber-like synthetic materials.

9. A leader holder for use by anglers which comprises a generally cylindrical substantially rigid tubular body, a transverse wall dividing said body into two internal storage compartments, removable end closures for said tubular body, annular rings on each end portion of said tubular body adjacent to and spaced slightly inwardly from said end closures, a cylindrical resilient pad of substantial uniform thickness surrounding said body between said end rings, a longitudinal row of a plurality of spaced leader holding elements projecting outwardly from the surface of said resilient pad, the outside diameter of said end rings being greater than the maximum diameter of said cylindrical resilient pad plus the height of the projecting leader holding elements, the inner surface of said resilient pad adjacent to at least one of said end rings being unsecured to said tubular body whereby extra leader line may be stored on the outer periphery of said tubular body adjacent to said end ring and under said pad.

10. A leader holder according to claim 9 further characterized in that said resilient pad is formed of a material selected from the group consisting of foam and sponge rubbers and rubber-like synthetic materials.

11. A leader holder according to claim 9 further characterized in that said end rings are polygonal.

References Cited in the file of this patent

UNITED STATES PATENTS

| | | |
|---|---|---|
| 1,915,208 | Walthers | June 20, 1933 |
| 2,370,013 | Crowell | Feb. 20, 1945 |
| 2,743,546 | Crist | May 1, 1956 |
| 2,756,946 | McAuley | July 31, 1956 |